United States Patent
Boshears

Patent Number: 5,875,737
Date of Patent: Mar. 2, 1999

[54] ANIMAL AMUSEMENT DEVICE

[75] Inventor: Donald L. Boshears, Tulsa, Okla.

[73] Assignee: TLC International, Inc., Cambridge, Mass.

[21] Appl. No.: 4,013

[22] Filed: Jan. 7, 1998

Related U.S. Application Data

[63] Continuation-in-part of Ser. No. 738,014, Oct. 25, 1996, abandoned.

[60] Provisional application No. 60/007,023, Oct. 25, 1995.

[51] Int. Cl.$^6$ .................................................. A01K 29/00
[52] U.S. Cl. .......................................... 119/706; 119/708
[58] Field of Search .................................. 119/702, 706, 119/707, 708, 709, 710, 711, 780

[56] References Cited

U.S. PATENT DOCUMENTS

| | | | |
|---|---|---|---|
| 2,096,078 | 10/1937 | Windson | 119/708 |
| 4,517,922 | 5/1985 | Lind | 119/708 |
| 4,577,590 | 3/1986 | Skroch | 119/706 |
| 4,930,448 | 6/1990 | Robinson | 119/708 |
| 5,067,440 | 11/1991 | Hatten et al. | 119/706 |
| 5,103,770 | 4/1992 | Berkovich | 119/708 |
| 5,119,001 | 6/1992 | Moore et al. | 119/708 |
| 5,572,955 | 11/1996 | Boshears | 119/706 |
| 5,575,241 | 11/1996 | Line | 119/706 |
| 5,579,725 | 12/1996 | Boshears | 119/706 |
| 5,595,141 | 1/1997 | Udelle et al. | 119/706 |
| 5,713,306 | 2/1998 | Johnson | 119/706 |

FOREIGN PATENT DOCUMENTS

| | | | |
|---|---|---|---|
| 40 07 676 A1 | 9/1991 | Germany | 119/708 |

*Primary Examiner*—Edgar Burr
*Assistant Examiner*—Leslie Grohusky
*Attorney, Agent, or Firm*—Dunlap, Codding & Rogers, P.C.

[57] ABSTRACT

An animal amusement device includes a base having an upwardly opening recess in which a corrugated scratch pad is installed. A pole extends upwardly from the base through the scratch pad and journals at its upper end a rotatable arm. The arm suspends an object by a flexible tether cord radially outward of the pole and above the level of the upper surface of the scratch pad. In another embodiment, the arm is mounted to a drive shaft of a motor secured in the pole whereby the object may be driven in a circular path about the pole by the motor.

9 Claims, 3 Drawing Sheets

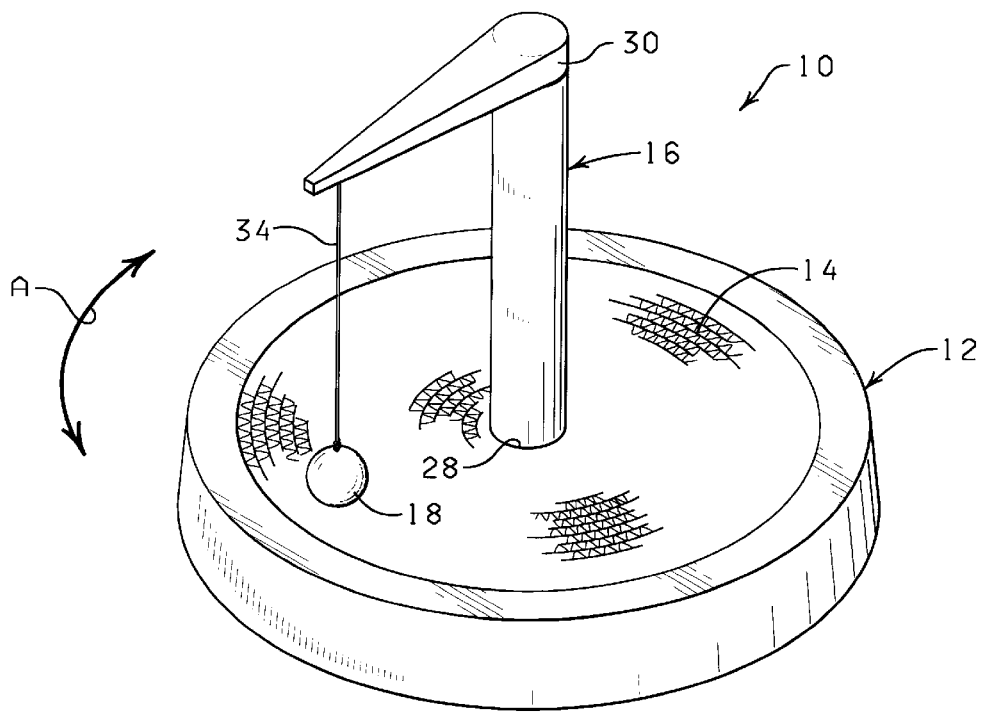
Fig. 1
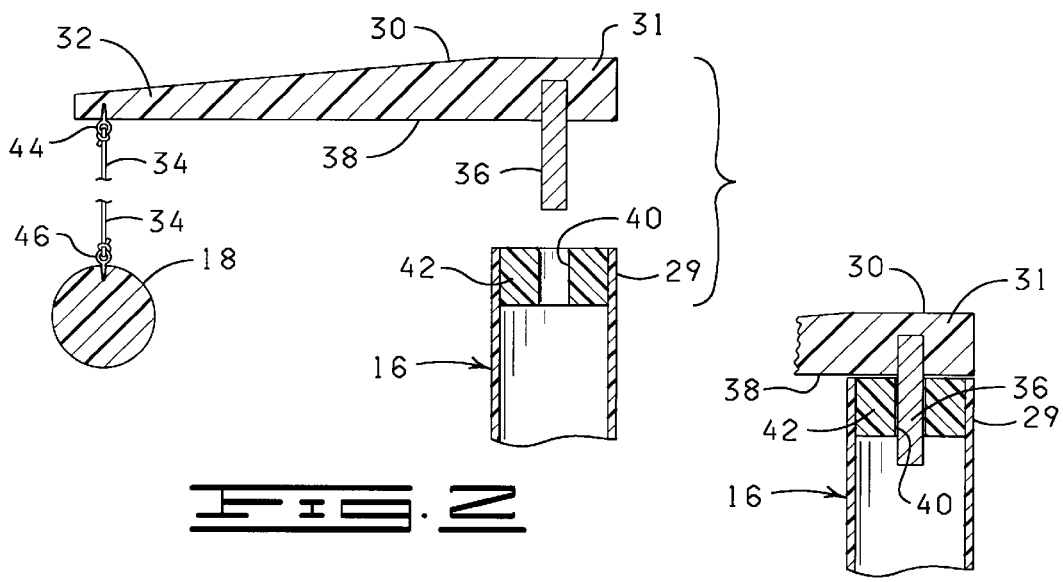
Fig. 2
Fig. 3

5,875,737

ANIMAL AMUSEMENT DEVICE

CROSS-REFERENCE TO RELATED APPLICATIONS

This application is a continuation-in-part of U.S. Ser. No. 08/738,014, filed Oct. 25, 1996, now abandoned, entitled ANIMAL SCRATCHING PAD AND AMUSEMENT DEVICE, which claims the benefit of U.S. Provisional Application Ser. No. 60/007,023, filed Oct. 25, 1995.

STATEMENT REGARDING FEDERALLY SPONSORED RESEARCH OR DEVELOPMENT

Not applicable.

BACKGROUND OF THE INVENTION

1. Field of the Invention

This invention relates generally to animal toys, and more particularly, but not by way of limitation, to an improved scratch pad and amusement device for cats in particular.

2. Brief Description of the Related Art

Various cat amusement devices are known to the art that include a corrugated paper scratch pad installed within the recess of a base. In some of these devices, the base includes an endless track surrounding the pad that opens to either the top or side to receive and guide a ball around the track when the ball is struck by the cat. U.S. Pat. Nos. 5,269,261 and 5,572,955 are examples of this type of amusement device.

Manufacturing the base with a track adds to the complexity and cost of producing the device and restricts movement of the ball to the confines of the track.

BRIEF SUMMARY OF THE INVENTION

An animal amusement device constructed according to the present invention comprises a base having a central, upwardly opening recess and a corrugated scratch pad installed in the recess. A tether pole extends upward from the center of the base through an opening in the scratch pad and journals a rotatable swing arm at its upper free end. The swing arm projects radially outward of the pole and has at its free end a flexible cord which tethers an object, such as a ball, over the upper surface of the scratch pad. When struck, the ball and swing arm revolve about the tether pole, and the ball has greater freedom of movement in all directions as compared to a ball confined in a track.

Alternatively, the arm is mounted to a drive shaft of a motor that is secured in the pole whereby the object may be driven in a circular path about the pole by the motor.

BRIEF DESCRIPTION OF THE SEVERAL VIEWS OF THE DRAWING

FIG. 1 is a perspective view of an animal amusement device constructed in accordance with the present invention.

FIG. 2 is an enlarged fragmentary sectional view showing features of the tether pole and swing arm.

FIG. 3 is an enlarged fragmentary sectional view similar to FIG. 2, but with the swing arm installed in the tether pole.

DETAILED DESCRIPTION OF THE INVENTION

Figure 4:
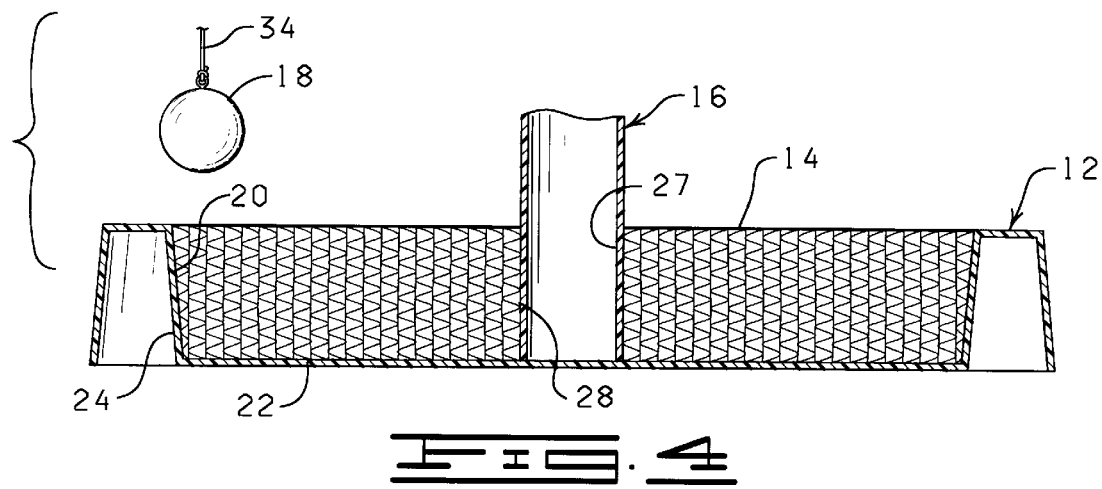
FIG. 4 is an enlarged transverse fragmentary sectional view of a lower portion of the animal amusement device.

FIG. 1 illustrates an animal amusement and scratching device 10 constructed in accordance with the present invention. The device 10 has a base 12 for removably supporting a scratch pad 14 and for mounting a tether pole 16 from which an object, such as a ball 18, is suspended for rotation relative to the base 12 and in a position accessible to an animal.

As best shown in FIG. 4, the base 12 is a one piece molded article having a central recess 20 closed at the bottom by a floor 22 and encircled by an upstanding inner annular sidewall 24 of the base 12. The scratch pad 14 is of corresponding shape and depth to that of the recess 20 and is fabricated preferably as a yieldable, compressive pad of shreddable open-celled paper material, such as corrugated cardboard, verticell, or the like. The open cells of the scratch pad 14 allow animals, in particular cats, to extend their claws into the pad and serve to receive and hold ground cat nip and any shreddings of the scratch pad material 14.

With reference to FIGS. 2–4, the tether pole 16 is formed preferably of plastic tubing material that is permanently or removably secured at its lower end 27 to the floor 22 of the base 12 and extends vertically upwardly therefrom through an opening 28 in the scratch pad 14 to provide an upper free end 29 spaced above the base 12 and the scratch pad 14 preferably about ten to twelve inches.

A swing arm 30 is journaled at its inner end 31 about the vertical axis of the tether pole 16 so as to extend radially outward therefrom to an outer free end 32 from which the ball 18 is suspended by a flexible tether cord 34 above the scratch pad 14 to enable the ball 18, when struck by the paw of a cat, to rotate freely around the tether pole 16 in either direction, indicated by arrow A in FIG. 1. As illustrated best in FIG. 2, the swing arm 30 is formed as a separate piece from the tether pole 16 and preferably of a low friction plastic material, such as nylon. The swing arm 30 is provided with a fixed pin 36 projecting vertically from a bottom surface 38 of the arm 30 for rotatable accommodation within a vertical axial opening 40 of a bearing 42 fixed in the upper end 29 of the tether pole 16. The bearing 42 is likewise made preferably of a low friction plastic material, such as nylon, so as to minimize frictional resistance to the rotation of the swing arm 30.

A pair of eye hooks 44, 46 may be secured to the free end 32 of the swing arm 30 and to the ball 18, respectively, for attachment of the tether cord 34. Other means of attachment, however, could be used, such as holes drilled through the swing arm 30 and the ball 18 through which the free ends of the tether cord 34 may be extended and secured, such as by tying a knot that is relatively larger than the holes.

Figure 5:
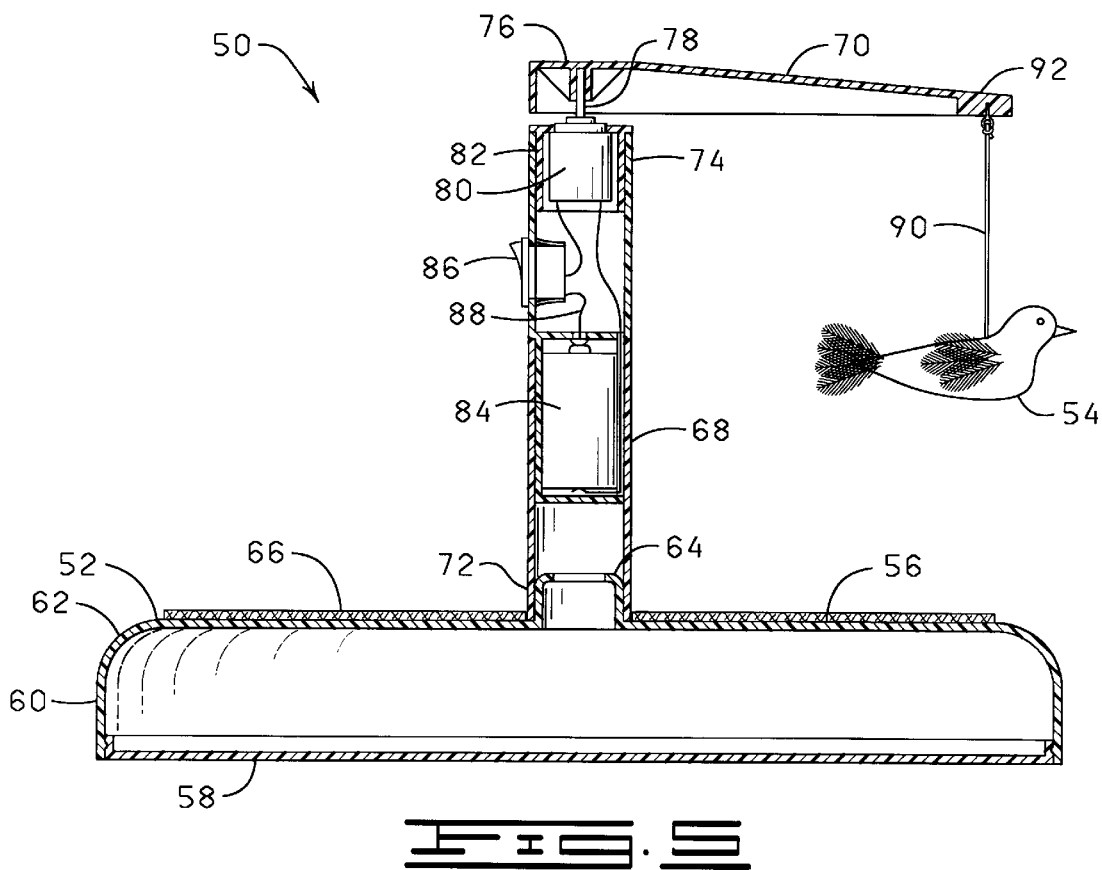
FIG. 5 is a cross-sectional view of another embodiment of an animal amusement device constructed in accordance with the present invention.

FIG. 5 is a cross-sectional view of another animal amusement device 50 constructed in accordance with the present invention. The device 50 includes a base 52 supporting a motor driven object 54, which simulates a bird. The base 52 includes a generally circular top 56, a generally circular bottom 58, and a sidewall 60. The top 56 and the sidewall 60 are preferably formed of a single member with a rounded transition portion 62. The top 56 is provided with a central hub 64 extending upwardly therefrom. For convenience of manufacture, the base 52 may be formed of a suitable plastic material.

A cat-type scratch pad 66 is secured to the top surface of the top 56. The scratch pad 66 may be made of any suitable material, such as sisal. Alternatively, the base 52 may be provided with a recess filled with a scratch pad of corresponding size and shape in a manner similar to that disclosed above in reference to the device 10.

The object 54 is supported over the base 52 by a rigid, vertically extending pole 68 and a rigid, horizontally extending arm 70. The pole 68 is a generally tubular member characterized as having a lower end 72 and an upper end 74. The lower end 72 of the pole 68 is sized to be slid over the hub 64 of the base 52 to provide a press fit connection between the pole 68 and the base 52. An inner end 76 of an arm 70 is suitably secured to a vertical drive shaft 78 of an electric motor 80. The electric motor 80 is secured in the upper end 74 of the pole 68 via a motor insert 82. The motor 80 is powered by a battery 84 which is suitably supported within the pole 68. A manually operated switch 86 is interposed in the connection 88 between the motor 80 and the battery 84 in order to energize the motor 80 when desired. As shown, the switch 86 is mounted to the side of the pole 68 so as to be readily accessible.

The object 54 is suspended from an outer end 92 of the arm 70 by a flexible tether cord 90 whereby the object 54 is suspended over the base 52.

In operation, when the motor 80 is energized by operation of the switch 86, the arm 70 and thus the object 54 are moved in a circular path around the pole 68. Thus, a cat using the device 50 can extend a paw to catch the object 54. Upon the cat releasing the object 54, the object 54 will continue in the circular path.

Figure 6:
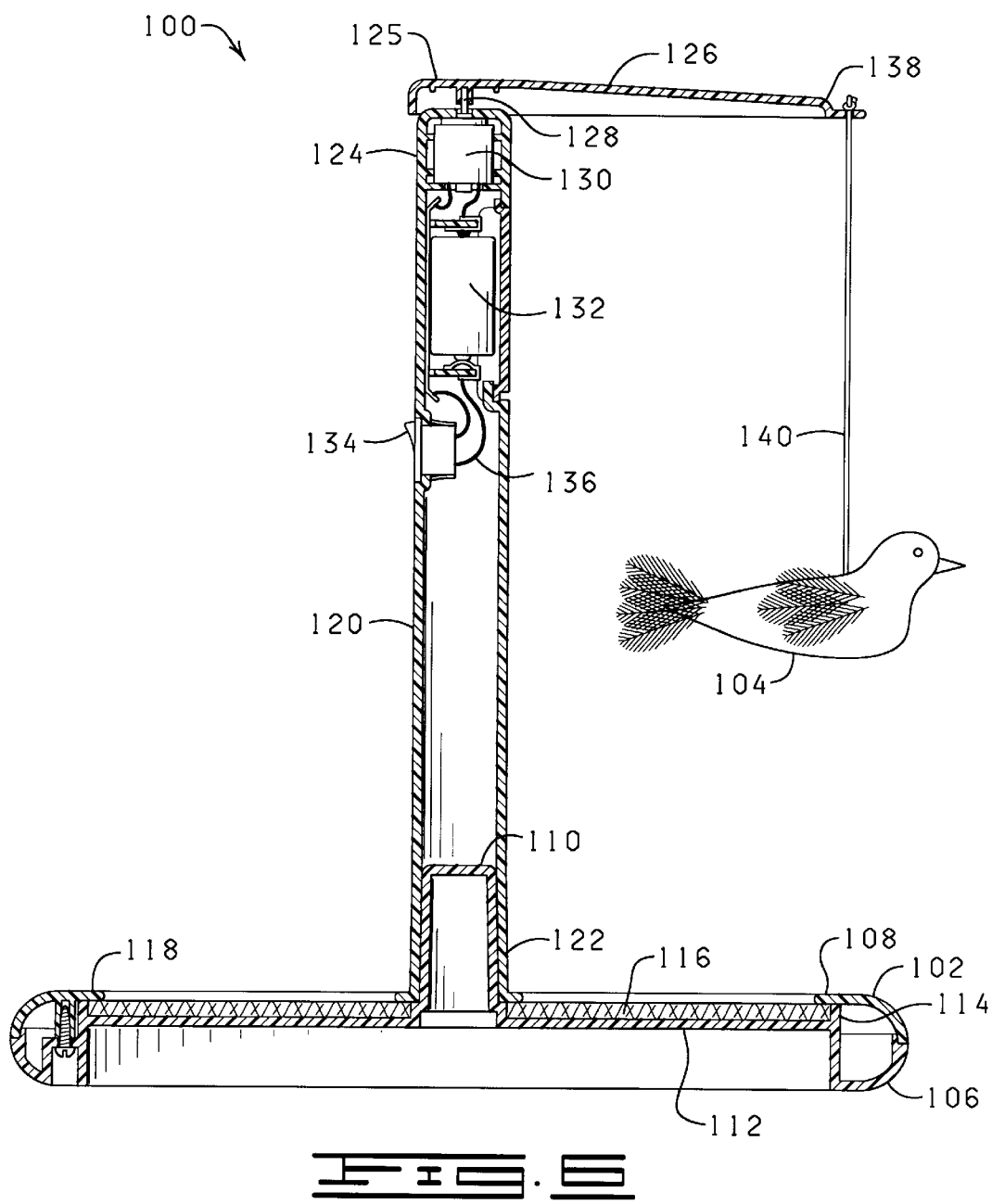
FIG. 6 is a cross-sectional view of another embodiment of an animal amusement device constructed in accordance with the present invention.

FIG. 6 is a cross-sectional view of yet another animal amusement device 100 constructed in accordance with the present invention. The device 100 includes a base 102 supporting a motor driven object 104, which simulates a bird.

The base 102 is generally circularly shaped and includes a lower portion 106 and an upper portion 108. The lower portion 106 is provided with a central hub 110 extending upwardly therefrom. A pad support surface 112 extends radially from the hub 110 and cooperates with the hub 110 and an upwardly extending flange 114, which is formed at the outer edge of the pad support surface 112, to support a cat-type scratch pad 116. The scratch pad 116 is secured to the pad support surface 112 with a suitable adhesive. As described above, the scratch pad 116 may be made of any suitable material, such as sisal.

The upper portion 108 is a ring shaped member adapted to be connected to the outer portion of the lower portion 106. The upper portion 108 includes an inwardly extending flange 118 which extends over the peripheral edge of the scratch pad 116 to prevent the peripheral edge of the scratch pad 116 from being detached from the pad support surface 112.

The object 104 is supported over the base 102 by a rigid, vertically extending pole 120. The pole 120 is a generally tubular member characterized as having a lower end 122 and an upper end 124. The lower end 122 of the pole 120 is sized to be slid over the hub 110 of the lower portion 106 of the base 102 to provide a press fit connection between the pole 120 and the base 102. An inner end 125 of an arm 126 is suitably secured to a vertical drive shaft 128 of an electric motor 130. The electric motor 130 is housed in the pole 120 proximate the upper end 124 thereby stabilizing the pole 120 during operation. The motor 130 is powered by a battery 132 which is suitably supported within the pole 120 proximate to the motor 130. A manually operated switch 134 is interposed in a connection 136 between the motor 130 and the battery 132 in order to energize the motor 130 when desired. Like the switch 86 described above, the switch 134 is mounted to the side of the pole 120 so as to be readily accessible.

The object 104 is suspended from an outer end 138 of the arm 126 by a flexible tether cord 140 whereby the object 104 is suspended over the base 102.

In operation, when the motor 130 is energized by operation of the switch 134, the arm 126 and thus the object 104 are moved in a circular path around the pole 120. Thus, a cat using the device 100 can extend a paw to catch the object 104. Upon the cat releasing the object 104, the object 104 will continue in the circular path.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. An animal amusement device comprising:

a base having an upwardly opened recess;

a scratch pad disposed in the recess so as to provide an exposed upper scratching surface and having a central opening and a peripheral edge;

a pole secured to the base and extending upwardly from the central opening in the scratch pad;

an arm having an inner end journaled to the pole and an outer end projecting radially outward from the pole;

a flexible tether cord having a first end and a second end, the first end being secured to the outer end of the arm; and an object secured to the second end of the tether cord to occupy a position over the scratch pad whereby the object may be driven in a circular path about the pole by an animal, wherein the base includes a lower portion and an upper portion, the lower portion having an outer portion and a pad support surface to which the scratch pad is attached, the upper portion is a ring shaped member adapted to be connected to the outer portion of the lower portion, the upper portion has an inwardly extending flange which extends over the peripheral edge of the scratch pad to prevent the peripheral edge of the scratch pad from being detached from the pad support surface of the lower portion.

2. The device of claim 1 wherein the scratch pad is made of shreddable open-cell paper material.

3. The device of claim 1 wherein the object is a ball.

4. An animal amusement device comprising:

a base;

a scratch pad having a peripheral edge;

a pole having a lower end and an upper end, the lower end of the pole connected to the base so that the pole extends upwardly from the base;

a motor secured in the pole proximate the upper end of the pole, the motor having a vertically extending drive shaft;

an arm having an inner end and an outer end, the inner end secured to the drive shaft and the outer end projecting generally radially outward from the pole;

a flexible tether cord having one end secured to the outer end of the arm; and an object accessible to an animal and secured to the opposite end of the tether cord to occupy a position over the base whereby the object may be driven in a circular path about the pole by the motor, wherein the base includes a lower portion and an upper portion, the lower portion having an outer portion and a pad support surface to which the scratch pad is attached, the upper portion is ring shaped and adapted to be connected to the outer portion of the lower portion, the upper portion has an inwardly extending flange which extends over the peripheral edge of the scratch pad to prevent the peripheral edge of the scratch pad from being detached from the pad support surface of the lower portion.

5. The device of claim 4 wherein the object is suspended directly over the scratch pad.

6. The device of claim 4 wherein the motor is an electric motor and wherein the device further comprises:

a battery secured in the tether pole and electrically connected to the motor; and a switch mounted to the tether pole and electrically interposed between the motor and the battery for controlling the operation of the motor.

7. The device of claim 4 wherein the object simulates a bird.

8. An animal amusement device comprising:

a scratch pad having a peripheral edge;

a base having a lower portion and an upper portion, the lower portion having an outer portion and a pad support surface to which the scratch pad is attached, the upper portion is ring shaped and adapted to be connected to the outer portion of the lower portion, the upper portion has an inwardly extending flange which extends over the peripheral edge of the scratch pad to prevent the peripheral edge of the scratch pad from being detached from the pad support surface of the lower portion;

a pole extending upwardly from the base;

a motor secured in the pole, the motor having a vertically extending drive shaft;

an arm having an inner end and an outer end, the inner end secured to the drive shaft and the outer end projecting generally radially outward from the pole;

a flexible tether cord having one end secured to the outer end of the arm; and an object accessible to an animal and secured to the opposite end of the tether cord to occupy a position over the base whereby the object may be driven in a circular path about the pole by the motor.

9. The device of claim 8 wherein the object is suspended directly over the scratch pad by the tether cord.

\* \* \* \* \*